July 31, 1962 H. B. GARDNER, JR 3,047,670
EDUCATIONAL DOLL
Filed July 10, 1959

INVENTOR.
Harry B. Gardner, Jr.
BY
Webb, Mackey & Burden
HIS ATTORNEYS

United States Patent Office 3,047,670
Patented July 31, 1962

3,047,670
EDUCATIONAL DOLL
Harry B. Gardner, Jr., % Gardner Associates, Inc.,
335 5th Ave., Pittsburgh 22, Pa.
Filed July 10, 1959, Ser. No. 826,162
13 Claims. (Cl. 179—82)

This application relates to the subject of educational toys and more particularly to a talking doll.

The present toy is a truly portable device, there being no external wires or other means of attachment thereto; and yet through a speaker therein, this device incorporates equipment enabling it to recite extended passages such as poems, nursery stories and like messages recordable in conventional way for playback through the speaker of a record player, tape player, etc. In fact, for purposes of the present invention, the audio signal power sufficient to drive any loud speaker, e.g., a public address speaker, is entirely adequate to operate the speaker of the toy.

In accordance with the requirements for operating this invention, the normal output power for a loud speaker of the phonograph or other sound sources to be used is diverted as alternating current into a ground-laid induction coil loop preferably located flat in a wayside play area. A companion pick-up coil carried by the doll is responsive to the audio frequency signals resulting in the ground-laid loop. This responsiveness is a wireless operation resulting by the process of inductive coupling whenever the toy is in the emitted area of the loop. By means of a captive amplifier system provided in the doll, the A.C. signals are amplified and employed to drive the speaker in the toy with sufficient power for normal strength and clarity; and the volume thereof is at all times controlled at the sound source. Subjectively from the doll's standpoint, the means of volume control can likewise be said to be effected through a wireless connection.

It has not heretofore been suggested that a portable doll or toy of general characteristics such as the foregoing can serve quite usefully as an educational device. In this regard, perhaps one of the most difficult problems occurring in the entire field is the training of mentally retarded children, and these children tend to show marked signs of apprehension toward instruction. For instance, some will instinctively be afraid of adult teachers. Moreover, towards strange objects, they have a certain fear and uneasiness particularly around electrical equipment and the attendant cables and cords. On the other hand, a toy to a child is one of the least suspicious-looking elements in his environment and he senses a certain equality if not general superiority thereover and altogether a feeling of naturalness.

Thus, the speaking doll of the present invention, capable of producing extended passages of memory work, nursery rhymes and stories or lessons and the like, has been suggested as a way to reach the child keeping him in the proper frame of mind and at ease so as to be receptive to the lessons and other mental drills. An advantage of the instant toy is that any desired selection or as many selections as desired can be rendered through the toy and, meantime, the child can play perfectly naturally therewith moving the toy around as he chooses.

While phonographs, either conventional or tape, are primarily intended as the sound source, any such utility equipment is satisfactory in which, as already indicated, there is an existing loud speaker and an associated amplifier circuit for producing audio signals normally sufficient to drive that speaker. Thus, a radio-receiving set can be introduced as the utility equipment but used such that not the radio loud speaker, but the toy will appear to do the broadcasting. Technically, however, there is in no sense the principle of radio broadcasting or rebroadcasting employed here, and thus no problem of F.C.C. licensing and authorization for operation on preassigned inflexible frequencies. That is to say, the instant toy does not rely on radio transmission and reception between itself and the utility equipment, nor are radio frequencies or tuned frequencies of any sort employed so that there is no need for oscillators, continuous tuners, demodulators, and like components. They are not only unnecessary but undesirable components in the rugged service here contemplated.

In the accompanying drawing, I have illustrated a presently preferred embodiment of my invention in which.

Figure 1:
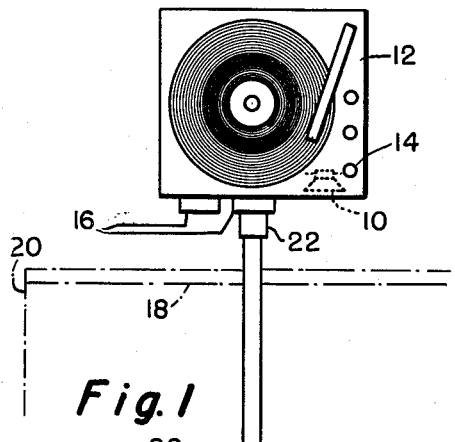
FIGURE 1 is a plan view of a wireless speaking toy system embodying the invention.

In the drawing, the regular loud speaker 10 of a sound source 12 is shown which, according to the illustration, consists of a conventional phonograph having the usual volume control 14 for controlling the electrical amplifier therein. I provide the sound source 12 with one or more outlet jacks 16.

The source 12 is located adjacent portions of a wayside play area 20 being preferably concealed behind a screen 18 so as not to be conspicuous. A single turn or multi-turn ground-laid coil 20a is concealed substantially level with the wayside area and adapted to be connected to one of the jacks 16 by means of a lead-in plug 22, the full purposes of the latter being more specifically described hereinafter. Briefly, it delivers audio frequency signals from the sound source 12 to energize the wayside coil 20a in a manner driving a remote speaker 24 located in a toy 26 which, as illustrated, consists of a child's doll. The remote speaker 24 will continue to play in accordance with the signal from the coil 20a as long as the toy 26 is kept in the same general vicinity of or within the coil. Volume is controlled at the source 12 by turning the volume control 14.

The speaker 24 is a miniature speaker kept in communication registering with the doll's countenance and, as illustrated, is actually carried within the head of the doll. The doll also carries an audio frequency pick-up coil 28 which is responsive to the emitted audio signal when brought within the general area of the coil 20a. The signal voltage which is induced in the coil 28 is passed first through two stages of conventional audio amplification in a path including, firstly, a coupling capacitor 29 and the base electrode of a transistor TR1 in circuit therewith. This first transistor TR1 has the collector thereof coupled to the base electrode of a second transistor TR2 constituting the second or driver stage of this particular amplifier. The driver stage is provided with an interstage coupling transformer 30 which matches the output impedance of the driver to the lower input impedance of a power amplifier or output stage. A pair of power amplifying transistors 32 and 34 constituting the power output stage operates in push-pull through a transformer 36 to drive the voice coil of the miniature speaker 24.

The base electrodes of the power transistors 32 and 34 are coupled to the output of the driver and these transistors receive supply voltage in their respective collector electrodes through a center tap 38 in the input winding of the transformer 36. The current which is supplied flows from a conductor connected by a hand switch 40 to one side of a single cell or plural cell dry battery 42. The battery at its other side is connected to a common return wire 44 in the circuit, there being no demands for high voltage anywhere in the circuit.

Two series-connected base bias resistors 46, 48 appropriately bias the base electrode of the first transistor TR1 and this transistor appropriately includes an emitter resistor 50 and a collector resistor 52 in circuit therewith. The emitter electrodes of the power transistors 32 and 34 are placed electrically in parallel and are returned to the battery through a common resistor 53. Resistors for biasing the base electrodes and various emitter and collector resistors are suitably provided for other transistors above named.

Figure 2:
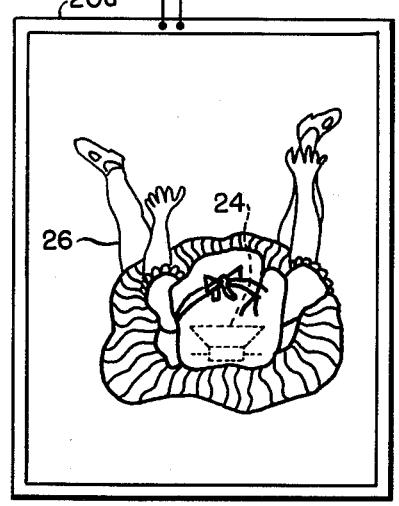
FIGURE 2 is a schematic diagram of the speaking doll shown associated with the wayside coil means in FIGURE 1.
Figure 2:
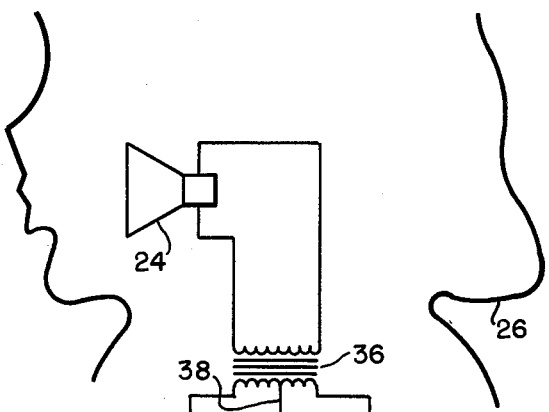
Figure 2:
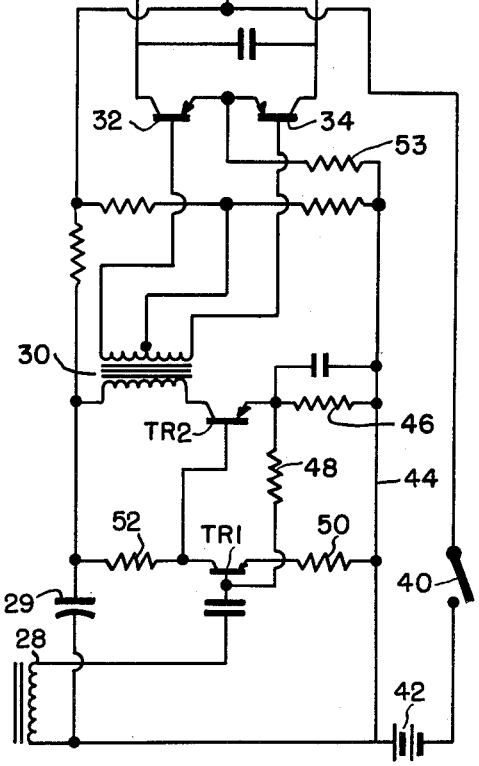

In the operation of the circuit of FIGURE 2, the first stage and driver stage transistors TR1 and TR2 cooperate to supply the transformer 30 which thus derives a control voltage representative of the amplified voltage of the audio frequency signal in the pick-up coil 28 and which impresses the latter as a control voltage on the power transistors 32, 34 whereby the miniature speaker 24 reproduces the audio output signal. The push-pull operation of the power transistors for increased power output is conventional in providing the speaker drive through the output winding of the transformer 36 and will not be specifically discussed. The transistorized circuit constitutes a negligible drain on the battery insuring long life, and the circuit is turned on and off by the switch 40 on the doll, preferably located in her back.

Figure 3:
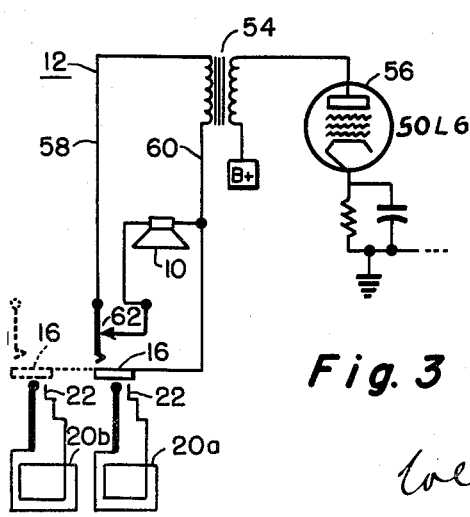
FIGURE 3 is a partially schematic diagram showing the wayside coils and the mode of their connection to the amplifier of a conventional sound source.

In FIGURE 3, the plugs 22 from one or several of the suitably concealed wayside coils 20a, 20b, etc. in the play area 20 are connected directly to the jacks 16 which I provide on the sound source 12. The audio output power resulting from transformer action in a transformer 54 supplied from the conventional power output tube 56 is delivered through a pair of speaker output leads 58 and 60. As each plug is introduced, the appropriate coil is connected across the speaker leads 58 and 60 and preferably the regular loud speaker 10 in the sound source is simultaneously disabled due to an openable contact 62 located in the first jack separating the spring-leaf connection between the loud speaker coil and one of its speaker leads.

In this way, the loud speaker will be dead and the entire volume of the sound source will emanate, without distraction or confusion as to source, from the remote speaker 24 located in the doll. Thus, as the doll is transported from the portion of the play area occupied by the wayside coil 20a to the play area portion occupied by the coil 20b and so forth, the doll will continue to talk establishing a general continuity in the messages so long as the coils are connected to the same sound source 12. It is not essential, however, that a single source be used and several different sources may be simultaneously employed using different coils in the area 20. As long as these coils are kept apart in their concealed areas, concealment being by means of a rug or the like, there will be no appreciable interference between one and the next in its influence on the remote speaker. When all coils are unplugged from the same sound source, the openable contact 62 is closed by the spring leaf, automatically restoring the regular loud speaker 10 to normal operation.

While I have described a present embodiment of my invention, it is to be understood that it may be otherwise embodied within the scope of the appended claims.

I claim:

1. In a wireless speaking toy system for use as a remote audio outlet for a sound source, in combination with the speaking toy, a pick-up circuit coil on said toy responsive to audio signal frequencies generated by the sound source, and means for causing the response of said coil to the frequencies generated by said source comprising a wayside coil operated by the audio output of said source and coupled in space to said pick-up coil when the coils are in spaced-apart proximity to one another, said toy having further circuits in the system comprising amplifier stages connected to said coil and including a power output stage, and a toy-carried, remote speaker for reproducing the audio output signal and coupled to the output of said power output stage in the toy.

2. In combination with a phonograph with phonograph pick-up means, first and second audio amplifiers of which the first is arranged in the phonograph coupled in the output of said phonograph pick-up means to produce phonographic audio signals, said first and second audio amplifiers having output stage terminals, a portable doll containing said second amplifier and further containing a speaker coupled to the output terminals of said second amplifier, and means for inductively coupling the second amplifier to the output of the first amplifier comprising a fixed, audio current coil connected to the output terminals of said first audio amplifier, and an inductive pick-up located within said doll inductively responsive to the same audio signal, but in attenuated state, emanating from said first amplifier through said fixed coil, said inductive pick-up connected to input terminals of the second audio amplifier for reproducing the audio output signals in the speaker in said doll in unconverted but reamplified state.

3. Wireless talking doll with a self-contained, self-powered sound outlet system therein comprising a pick-up coil affixed to the doll responsive to space emitted audio output frequency signals, a speaker in the doll's head and directed towards the doll's mouth, and energized audio amplifier stages operated in response to said pick-up coil and coupled in driving relation to said speaker for reproducing the audio output signals, the input to said audio amplifier stage being constituted solely by said pick-up coil.

4. Wireless talking doll having a pick-up coil affixed thereto responsive to space emitted amplified audio output signals, a speaker in the doll's head and directed towards the doll's mouth, audio amplifier means for operatively coupling said signal responsive coil and said speaker, the input to said audio amplifier means being constituted solely by said pick-up coil, and a current source within said doll common to said amplifier means and to said speaker and energizing same for reproducing said audio output signals at the amplified level desired.

5. A wireless talking doll responsive to the volume-controlled amplifier of a sound source, there being coupling means for rendering said doll responsive to audio signals from said sound source comprising a flat induction coil bounding a play area portion and emitting audio frequency signals in space, said doll being portable within the play area portion and including therein, in combination, a pick-up coil affixed thereto responsive to the emitted audio frequency signals in said area, a miniature speaker, amplifier means for operatively coupling said pick-up coil and said speaker, a current source self-contained within the doll, and a hidden switch, accessible to the hand, on said doll establishing a connection connecting said current source in common to said amplifier means and said speaker for energizing same to reproduce the audio frequency signals in said speaker at an amplified level.

6. Wireless talking doll according to claim 5 wherein the volume control on said sound source constitutes the sole means of controlling the output volume of said miniature speaker.

7. In a wireless speaking toy for use with a phonograph having an amplifier circuit, a loud speaker driven thereby, and a wayside play area coil for connection in place of the speaker, there being a speaker in said toy; the improvement comprising means for selectively rendering ineffective said phonograph loud speaker in said circuit and connecting thereacross said coil and, in combination therewith, self-powered audio frequency means in said toy enabling said phonograph to play in said speaker in a toy, said last-named means having circuits comprising means carried by said toy for inductively coupling in space with the wayside coil as a result of the toy being moved to a closely spaced-apart relationship to the wayside coil and including an untuned audio frequency pick-up, means providing voltage amplification of the induced audio frequency signal including plural stage electronic amplifier means, means for driving said speaker in the toy including control voltage responsive power means connected thereto, and means deriving a control voltage representing the amplified output of said audio frequency signal for impressing the latter as the audio voltage on said power means whereby said speaker reproduces the audio output signal.

8. In a wireless speaking toy, in combination with a regular phonograph loud speaker and a first amplified power output drive circuit to provide amplified power output to the loud-speaker from an amplified audio output signal, said speaking toy adapted to be played with in a play area and having a self-powered, low-voltage electrical system confined therein which provides a second amplifier circuit comprising amplifier stages including a power output stage, a remote speaker adapted to be responsive to said regular speaker drive circuit to the mutual exclusion of the regular loud speaker and coupled to the power output stage in said toy for reproducing the audio output signal, and means for causing the response of said remote speaker to said audio output signal consisting of a plurality of wayside coils located common to the same play area, separate electrical connections between said regular speaker drive circuit and each of said coils and including at least one plug disconnect which in being connected disconnects the regular loud speaker, and a pick-up coil operated by different ones of said coils by means of inductive coupling and permanently electrically connected to said second amplifier circuit in said toy.

9. In a wireless speaking toy for use with a sound source having an amplifier circuit and a loud speaker driven thereby, there being a speaker in said toy, the improvement comprising a wayside coil coupled to said circuit, means to alternately connect said coil and said loud speaker to said circuit, and, in combination therewith, self-powered audio frequency means in said toy enabling said source to play in said speaker, said last-named means having circuits comprising means carried by said toy for inductively coupling in space with the wayside coil as a result of the toy being moved to a closely spaced-apart relationship to the coil and including a small untuned audio frequency coil, means providing voltage amplification of the induced audio frequency signal including plural stage transistor means, means for driving said speaker including power transistor means connected in push-pull and responsive to a control voltage impressed thereupon, and means deriving a control voltage representing the amplified voltage output of said audio frequency signal for impressing the latter as the control voltage on the power transistor means whereby said speaker reproduces the audio output signal.

10. A speaking toy system effecting wireless communication at audio frequencies comprising the combination of a phonograph having an electrical amplifier for playing recorded messages and other recordings, a toy figure having therewithin a speaker and a self-contained battery-operated amplifier system therefor with an untuned audio frequency pick-up coil for operating same, and inductive coupling means comprising a wayside coil coupling at audio frequencies in space with the audio frequency pick-up coil of the toy figure and connected in the output of the amplifier of the phonograph whereby playing of the latter operatively plays through the speaker in the toy figure.

11. A speaking toy system effecting wireless communication at audio frequencies comprising the combination of a remote phonograph having an electrical amplifier for playing recorded messages and other recordings, a toy figure having therewithin a concealed speaker and a self-contained battery operated amplifier system therefor with an untuned audio frequency pick-up coil for operating same, a flat rug, and inductive coupling means comprising a wayside coil in flat concealed relation beneath at least a surface of the rug and with their planes at least substantially coplanar and parallel, said wayside coil coupling at audio frequencies in space with the audio frequency pick-up coil contained in the toy figure and connected in the output of the electrical amplifier of the phonograph whereby playing of the latter operatively plays through the concealed speaker in the toy figure.

12. In a speaking toy system for use in effecting wireless communication at audio frequencies with a speaking toy figure, said toy figure having therewithin a miniature speaker and a self-contained battery-operated amplifier system therefor with an untuned audio frequency pick-up coil for operating same, the combination of a phonograph having an electrical amplifier circuit, a loud-speaker driven thereby, a wayside play area coil for connection in place of said loud-speaker, means for selectively rendering ineffective said loud-speaker in said circuit and connecting thereacross said coil, said wayside coil being operative for inductively coupling in space with the pick-up coil as a result of the toy being moved to a closely spaced apart relationship to the wayside coil, and a volume control on said phonograph and connected in said amplifier circuit for constituting the sole means of controlling the output volume of said miniature speaker.

13. In a speaking toy system for use in effecting wireless communication at audio frequencies with a toy figure, said toy figure having therewithin a miniature speaker and a self-contained battery-operated amplifier system therefor with an untuned audio frequency pick-up coil for operating same, the combination of a phonograph having an electrical amplifier circuit, a loud-speaker driven thereby, a flat looping coil for connection in place of the loud-speaker and occupying a wayside play area no larger than the dimensions of a rug and disposed with said wayside coil in flat concealed relation so as to be beneath the surface of the rug and with their planes at least substantially coplanar and parallel, and means for selectively rendering ineffective said phonograph loud-speaker in said circuit and connecting thereacross said flat coil to produce an inductive field whereby said coil inductively couples in space with the pick-up coil of said toy incident to the toy being moved to a closely spaced apart relationship to the flat coil.

References Cited in the file of this patent

UNITED STATES PATENTS

| 2,247,329 | Deitz | June 24, 1941 |
| 2,470,384 | Waldron | May 17, 1949 |
| 2,899,547 | Crow | Aug. 11, 1959 |

FOREIGN PATENTS

| 292,414 | Great Britain | June 21, 1928 |